Patented Apr. 23, 1935

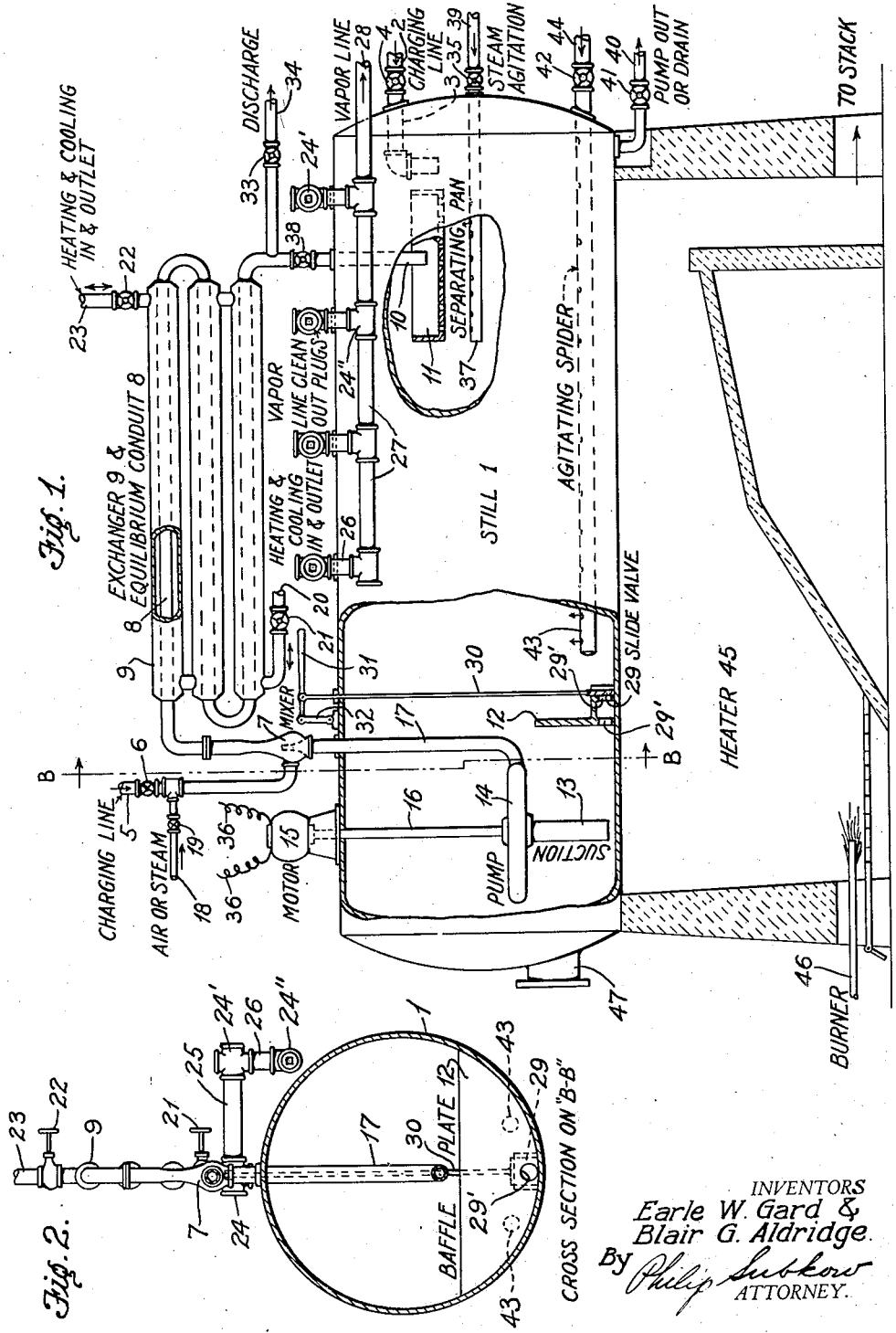

1,999,018

UNITED STATES PATENT OFFICE 1,999,018

OXIDIZED ASPHALT

Earle W. Gard and Blair G. Aldridge,
Los Angeles, Calif.

Application June 8, 1931, Serial No. 542,998

1 Claim. (Cl. 196—152)

This invention relates to a process and apparatus for treating petroleum oils, and in particular to the production of oxidized or air-blown asphalts.

The use of air and steam in varying proportions has been used for many years and is well known in the art of producing oxidized asphalt. By varying the proportions of air and steam, the quality of the asphalt may be changed slightly. The time required to blow down the petroleum oil to the required specification varies from 18 to 36 hours, depending upon the character of the original stock and the character of the final product. Generally, the higher the API gravity of the charging stock, the longer the time required for the process to bring the stock to the desired characteristics.

In the processes now in use it is impossible to obtain a high melting point asphalt, 250° F. and above, with a penetration of over 15 and a ductility of over 1 cm. at 77° F. The melting point, penetration and ductility, are not independently variable. If the melting point is increased, the penetration is decreased and the ductility decreased. This is due to the fact that the methods used cause some of the asphalt to become over-oxidized and part to be under-oxidized. This is due to the fact that certain of the constituents are more refractory, i. e., oxidize slower than others. The air passes through the oil in large globules and is not mixed intimately with all of the oil. The rate of oxidation must be fairly slow or the temperature of the oil will rise too high, with a resultant low yield and poor quality of asphalt. In processes where oil is mixed with air in a tube, the rate of oxidation is not controlled, and consequently the oxidation is not uniform and the same evils result.

It is an object of our invention to control the melting point, penetration and ductility so as to vary them independently, and it will make asphalts of any desired specifications.

It is a further object of our invention to control the oxidation of the oil to produce asphalt so as to obtain a uniformly evenly oxidized oil, the varying components of which will not become over-oxidized or under-oxidized.

It is a further object of our invention to provide a process and apparatus for controlling the intermingling of the oil and oxygen, to regulate the rate of reaction, and to control the character of the oxidation.

It is a further object of our invention to establish an equilibrium relationship between the oil to be oxidized and the oxygen-containing gas, whereby maximum efficiency of oxidation is obtained, and to remove the gaseous and vaporous reaction products from the system so that oxygen at optimum concentrations may act on the oil in process.

It is a further object of our invention to control the oxidation of the oil so as to partially oxidize the oil by contacting it with oxygen-containing gas to produce substantially complete use of the air under controlled conditions and to remove the gaseous and vaporous reaction products and to repeat this partial oxidation in recurring cycle of operation until products of desired characteristics are obtained.

It is a further object of our invention to control the temperature of the reacting products, i. e., the oil and air, so as to maintain the reacting products at a controlled temperature during reaction.

It is a further object of our invention to cause the intimate commingling of the oil and air for a predetermined length of time under controlled temperature and to separate the vaporous and gaseous products and to repeat the process in recurring cycles of operation until a product of desired quality is obtained.

Other objects will appear from the description of the preferred embodiment of our process appearing below.

We have found that in order to obtain asphalts of high melting point which will have high ductility and desired penetration, it is necessary to produce an intimate mixture of the oil to be oxidized and the oxygen-containing gas, such as air, so that all parts of the oil are simultaneously exposed to the action of the air. It is also desirable to maintain the air in intimate contact with the oil so that the oxygen of the air is consumed as much as possible. This promotes efficiency in the use of air and also permits the more refractory components of the oil to be oxidized. These components need more time, since they oxidize much slower. During this reaction an increase in the temperature occurs, and provision should be made to control the temperature to prevent over-oxidation. This, it will be found, necessitates, under most circumstances, an abstraction of heat, except when very hard asphalts are desired, heat may be added. It is recognized that in the methods now employed, where air is blown through the oil, that some cooling by contact with the cold air necessarily results. But this incidental and uncontrolled cooling is far removed from the present controlled cooling. Additionally, in order to get any amount of cooling so much excess air must be used as to result in over-oxidation and uncontrolled oxidation and a rise in temperature due to oxidation which counterbalances the cooling effect and actually heats the oil. The final effect of the air is to actually heat the oil, for in every case the heat of oxidation more than offsets the cooling effect of the injected cold air. We have also found that the products of the reaction should be removed so that the partially oxidized components may be again contacted with fresh air.

The process and apparatus will be better understood by reference to the drawing which contains a more or less schematic embodiment of the apparatus. Fig. 1 is a flow view of the apparatus with parts broken away. Fig. 2 is a cross-sectional view taken along line B—B on Fig. 1.

1 is a cylindrical still for containing the bulk supply of oil.

4 is a valve connecting charging line 2 with the internal charging line 3 for charging still 1.

5 is a second charging line and 6 a valve in lines.

7 is a jet mixer in which the oil and air or steam are intimately mixed before being passed through exchanger 9.

8 is an equilibrium conduit in which the oxidation of the oil takes place.

9 is an exchanger of which the equilibrium conduit is a part and is used for cooling or heating the oil during its passage therethrough.

10 is a return pipe extending through the shell of the still 1 connecting conduit 8 with still 1.

11 is a separating pan over which the oil passing from 10 is distributed so that vapors and air can be released.

12 is a baffle plate in still 1 extending across the bottom of the still to form two compartments in the bottom of the still.

13 is the suction line of pump 14 extending to the bottom of still 1.

14 is, preferably, a centrifugal type of pump used to circulate the oil from the still through the exchanger 9 and equilibrium conduit 8.

16 is a shaft connected to electric motor 15 for driving pump 14.

17 is a discharge line from pump 14 to mixer 7.

18 is a section of pipe connected to valve 19 for admitting air or steam into mixer 7.

20 is a section of pipe connected to valve 21 for transmitting heating and cooling media to or from equilibrium conduit 8 and exchanger 9.

23 is a section of pipe connected to valve 22 for transmitting heating and cooling media, such as steam, oil or air, to and from exchanger 9 and equilibrium conduit 8. It is obvious that instead of using a jacketed pipe any other type of cooling coil may be employed as, for instance, an aerial cooler including means for regulating the flow of air over the coil 8.

34 is a discharge pipe containing valve 33 to be used in discharging oil from still 1 to storage.

24 are pipe sections containing clean-out plugs 24¹ and used to connect the vapor lines 27 and 26 and to the shell of still 1.

28 is a section of pipe connected to vapor line 27 to lead the vapors away from still 1.

29 is a slide valve positioned in the extreme bottom of baffle plate 12 to allow oil to flow from one side to the other of baffle plate 12 through opening 29¹.

30 is a rod connected to slide valve 29 and valve lever 31 so that slide valve 29 may be open or closed.

32 is a fulcrum support so that valve handle 31 may be properly operated.

24¹¹ are T's used to connect sections of vapor line 27 together.

25 are sections of pipe connecting vapor crosses 24 to vapor pipes 26 and 27.

35 is a valve in steam agitation spider 37 connected to steam supply line 39.

38 is a valve positioned between pipe 10 and equilibrium conduit 8, which is to be closed when discharging oil through valve 33 and pipe 34.

40 is a section of pipe connected to valve 41, which is in turn, connected to the bottom of still 1 and is to be used as a pump-out or drain line.

42 is a valve in bottom agitation spider 43.

44 is connected to steam and air supply lines.

36 are electric leads to motor 15.

45 is the heater or firebox positioned under still 1 for supplying external heat to the still.

46 is a burner for supplying heat to the heater or firebox 45.

47 is a manhole for cleaning the still.

A hydrocarbon oil, or preferably a residuum from such an oil obtained by distilling off the volatile oils from crude oil, is charged into line 5, through valve 6 and mixer 7 and line 17, then through pump 14 and line 13 into still 1. The oil may also be charged directly to the still 1 through line 3 and valve 4 or through the discharge line 34, valve 33, valve 38 and line 10, into still 1. Preferably, the oil is charged backward through pump 14, valves 33, 38, 42, 41, 35 and 19 being closed. When the required charge is in the still, pump 14 driven by shaft 16 and motor 15, connected to an electrical circuit through line 36 is started and the oil in still 1 is forced through line 17, mixer 7, then through equilibrium conduit 8 of exchanger 9, where it is heated by any heating medium, such as steam or hot oil, entering line 20 and valve 21 and exiting through valve 22 and line 23, valve 38 being open. The oil then flows through line 10 onto separating pan 11 and back into still 1. Slide valve 29, located in baffle plate 12 and operated by connecting link 30, connected to handle 31 which is supported by fulcrum 32 attached to shell of still 1, is opened during the heating-up period. The fire under still 1 is lighted and the oil is additionally heated by the gases of combustion in firebox 45. The oil is circulated and additional material is introduced through valve 6. As soon as the required amount of oil, about 300 barrels, is charged to the still, valve 6 is closed and about 200 cu. ft. of air per minute is admitted through valve 19 and line 18 into mixer 7. The oil is now circulating at the rate of between 1500 and 2000 bbl. per hour by pump 14. This rate of air admission is continued until the oil in the still 1 reaches a temperature of around 300° F. This should require about one hour. The air is then increased to 300 cu. ft. per minute and continued at this rate until the oil reaches a temperature of 500° F. This should require about four hours. A small amount of top steam is put in through line 39, valve 35 and agitation spider 37, as soon as the oil reaches 300° F. The amount of steam is varied, depending upon the specifications to be met, as will be described below. The vapors and steam leave the still through vapor line 28 and connections 26 and 27. Slide valve 29 is closed as soon as the still has been properly charged and circulation established. This causes the oil to flow over baffle 12 to break up the bubbles of air and steam in the oil and give a quiet zone around the pump suction. This allows the pump to take a full suction and avoids a gas-locked or air-bound pump. Steam agitation may be used in the bottom spider during the entire run to augment circulation in the still, and it is generally increased after the oil reaches 500° F. This steam distillation is used at this stage to control the flash of the stock, as will be described below. This may require one hour. The rate of circulation of the oil through exchanger 9 and equilibrium conduit 8 may be controlled by valve 38 or by varying the speed of the pump 14 through shaft 16 and motor 15. The cooling medium, such as steam, oil or air, in exchanger 9, may be circulated at any desired amount to obtain the proper amount of cooling by heat exchange out of contact with the reacting materials. When the oil has been brought down to desired grade it may be left in the still until needed or pumped or drained out through line 40 and valve 41, or it may be pumped out by pump 14 through the discharge line 34 and valve 33 after valve 38, valve 19 and valve 6 have been closed. In either method of removing the oil, slide valve 29 must be opened so that all of the oil can be removed.

We prefer to use a slight vacuum in the vapor line and still—about 5 ins. water—to facilitate the removal of the gases.

As a specific example, we will describe the operation and the type of oil. An asphaltic residuum, obtained by removing the light oils and intermediate boiling oils from our asphaltic base oil, is charged, through a preheater (not shown) into a still through a jet-like mixer 7, as previously described above. As soon as the oil is in the still the circulating pump is started and the oil is circulated at a high rate through the exchanger and back into the still. The heating medium is passed through the exchanger and the still is fired until the oil reaches 500° F. Air is forced or drawn into the oil just before it enters the exchanger and equilibrium conduit. The amount of air is regulated so that the oil rises in temperature to about 500° F. As an example, oil circulated by the pump at 1500 to 2000 bbls. per hour; air is admitted at the rate of 200 cu. ft. per minute until the oil reaches 300° F. The air is then increased to 300 cu. ft. per minute until the oil has attained a maximum of 500° F. As soon as the oil reaches this temperature, the fire is put out under the still and sufficient cooling medium is circulated in the exchanger and equilibrium conduit to keep the temperature of the oil being processed below 500° F. Hot or cold water, or oil, or steam of controlled pressure and temperature, or air, may be used to control the temperature in the conduit. The length of pipe in the exchanger and equilibrium conduit and the circulation of oil and the air input is such that the oxygen of the air is substantially used up before the oil is returned to the still where the air and gases and light vapors are removed. The oil is circulated very rapidly and thus all parts of the oil are kept in intimate contact with the air at practically all times. We have discovered that generally a low temperature should be used in such processes, so that a superior product may be produced. This temperature should be as far below 500° F. as it is possible to carry it. If the temperature be raised to too high a degree, considerable distillation of the lighter fractions will take place and the stock will attain the proper penetration before the desired melting point is reached. This is due to the removal of the light fractions which oxidize to a more plastic material than the heavy fractions. By using the equilibrium conduit a minimum of air is used, so that we are able to use about half the amount now used in other processes. We have also discovered that by using rapid circulation and the controlled amount of air and the carefully regulated temperature in the exchanger and equilibrium conduit, the running time is reduced to half that now regularly required in the other systems.

Steam may be admitted during the process through agitation spider 43. This aids to insure circulation of the oil in the still and in obtaining the right flash point for the product. Steam may also be admitted, either throughout or towards the end of the process, through spider 37 to aid in obtaining the proper flash and ductility. This will be understood by those skilled in the art. The vapors and gases are withdrawn through line 28 as previously described, preferably under light suction.

Steam may also be admitted through line 19 together with air so as to control the rate of oxidation and also to control the ductility and flash. It will be observed that the apparatus can be also very effectively used as a process for making steam-blown asphalt. In this case no air is admitted and a heating medium is circulated through 9. This insures an intimate mixture of asphalt and steam and a controlled distillation of high efficiency. No air is used when steam-blown asphalt is produced. The process is, therefore, of general applicability where a liquid is to be reacted on or distilled by means of a vapor or gas. For purposes of definition, the general phase "operating gas" will be intended to cover both phases of the generalized invention. It is, of course, of primary importance in producing air-blown asphalt and of importance also in steam distillation.

It will be observed that many variations of the above procedure can be made without departing from the spirit of the invention. Thus, the cooling can be obtained by cooling the oil in the still 1 by passing the cooling medium through a coil in the still. The agitation of the oil in the still may be by circulation by a mechanical means, or by injection of an inert gas, or by the air used in the process. The conduit can be positioned either within the still or in an external heating zone, such as a furnace, or the oil may be withdrawn from the still, passed through a cooler and then sent through the conduit 8 before it is introduced into the still. In each case the oil in conduit 8, on its reaction with air, is not allowed to exceed a predetermined temperature. While the precooling of the oil before introduction of the oil into conduit 8 may have some advantages, the cooling of the oil during reaction with the air is preferred. It is believed that of these methods for accomplishing this, i. e. cooling the coil itself or cooling the oil in still 1 when the coil 8 is immersed in still 1, the former is preferred. It is believed that the construction illustrated in the drawing is the most advantageous.

We have discovered that by properly controlling the heat-air-steam, time and rate of circulation, a wide variation of melting point, penetration and ductility may be obtained. We have been able to obtain ductilities of over 5 and 6 cm. at 77° F. on stock that under the old systems gave only 1 cm. or less. In many cases, with the proper stock and control, the ductility can be raised considerably higher.

We have found that we can produce a new material which is an oxidized asphalt that is evenly oxidized and does not contain large proportions of over-oxidized or under-oxidized material. The process is more economical to operate than any other. We have been able to use approximately 50% or less air than in the present systems. We have been able to reduce the running time approximately 50% or more. By operation, according to our invention, the yield of oxidized asphalt is increased. We have been able to produce any grade of oxidized material by an even control of air-steam-heat and rate of circulation. and to produce an oxidized material with the production of practically no carbon in the still.

It has been found possible to obtain an oxidized asphalt as high as 375° F. melting point, with a ductility of 1 cm. or better. This has heretofore been an impossibility. We have produced asphalts up to 375° F. melting point, with a penetration of as high as 5 cm. at 77° F. and a ductility of from 0.5 to 2 cm. at 77° F. We have made asphalts varying from 250° to 350° F. with penetrations varying from 15 to 10 cm. at 77° F. and ductility varying from 6 to 1 cm. at 77° F. We have made asphalts varying from liquid asphalts to those of melting point of 250° F., penetration as high as 15 at 77° F., and with ductility as low as 1 to 6 cm. at 77° F. for asphalts having melting points in the neighborhood of 250° F. Such results have heretofore never been achieved and are occasioned by our scientific control of the oxidizing reaction for different types of initial charging stock.

Whenever melting point is mentioned, it is to be interpreted as measured by the A. S. T. M. method D-36-24, also disclosed in the Kansas City Testing Laboratory Bulletin No. 25, page 641. Whenever penetration is mentioned, it is to be interpreted as measured by the A. S. T. M. method D-5-25, also described in the Kansas City Testing Laboratory Bulletin No. 25, pages 686 and 687. Whenever ductility is mentioned, it is to be interpreted as measured by the A. S. T. M. method D-113-26-T, also described in the Kansas City Testing Laboratory Bulletin No. 25, page 688.

We claim:

An oxidized asphalt produced from a naphthenic base crude oil by oxidation of fractions thereof which asphalt has a melting point of approximately 375 to 300° F. and a penetration of from 10 to 15 and a ductility of .5 to 2 cm. at 77° F.

EARLE W. GARD.
BLAIR G. ALDRIDGE.